Feb. 28, 1950  H. F. PITCAIRN  2,499,161
ROTATIVE WINGED AIRCRAFT CONTROL
Original Filed May 15, 1944
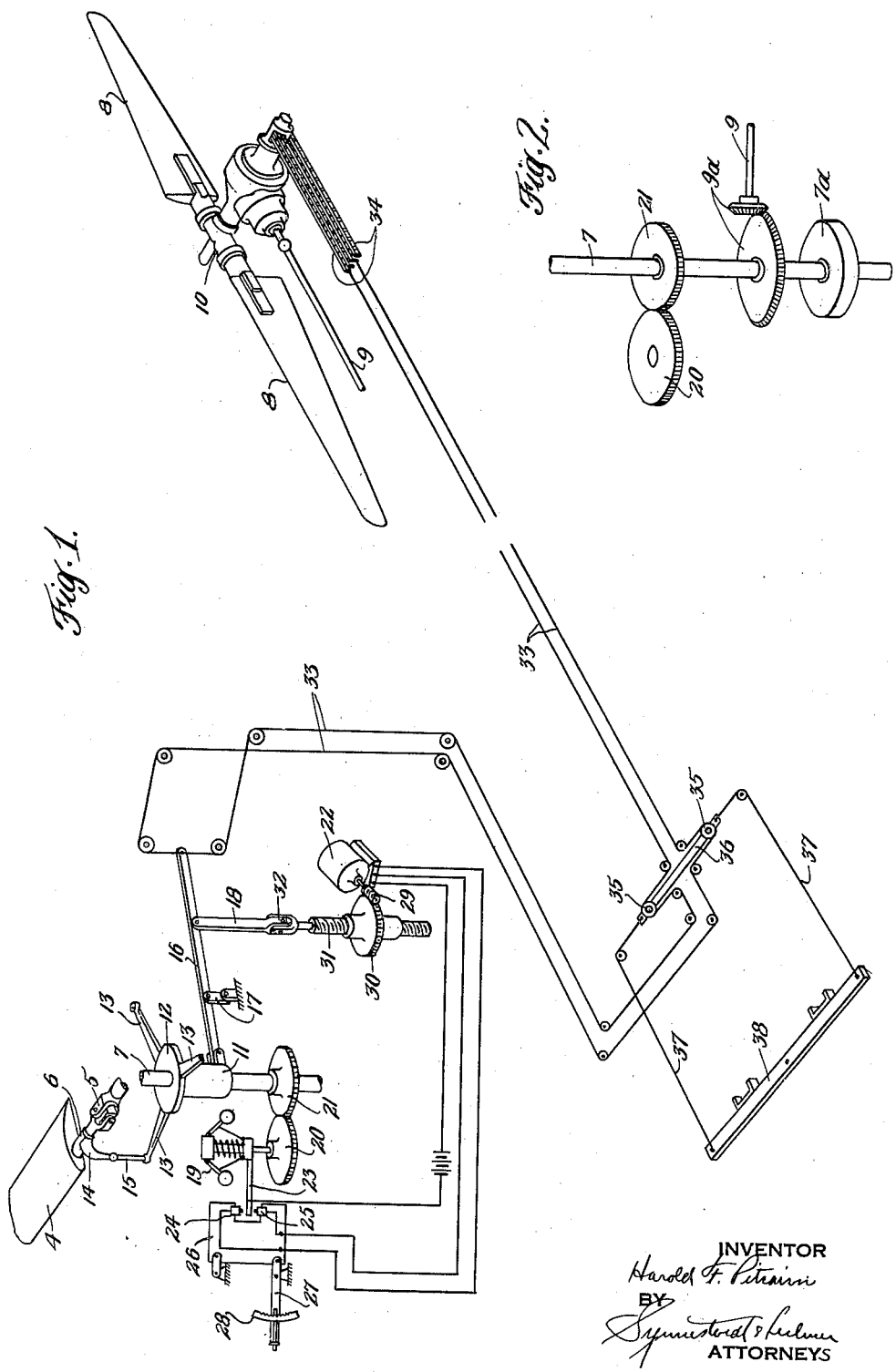
INVENTOR
Harold F. Pitcairn
BY
ATTORNEYS Patented Feb. 28, 1950

2,499,161

UNITED STATES PATENT OFFICE 2,499,161

ROTATIVE WINGED AIRCRAFT CONTROL

Harold F. Pitcairn, Bryn Athyn, Pa., assignor to Autogiro Company of America, Philadelphia, Pa., a corporation of Delaware Original application May 15, 1944, Serial No. 535,632. Divided and this application May 31, 1946, Serial No. 673,473

3 Claims. (Cl. 170—135.22)

This invention relates to rotative winged aircraft, and particularly to control systems for such aircraft.

The invention is especially adapted to rotative winged aircraft of the type having a sustaining rotor adapted to be driven through the hub, and having an anti-torque rotor or airscrew positioned so as to counteract the rotor driving torque. In aircraft of this type the anti-torque airscrew may be located at the tail of the machine or laterally toward one side as in Bennett Patent No. 2,317,340, issued April 27, 1943. In either arrangement, the airscrew is adjustable to vary the thrust thereof, whereby said airscrew may be employed not only to counteract the rotor driving torque but also as a means for controlling the aircraft in yaw.

According to the invention it is contemplated that the blade pitch angle of the sustaining rotor be controllable so as to vary the lift of the rotor. In various kinds of flight, adjustment of the rotor blade pitch angle results in appreciable variation in the rotor drive torque reaction. Thus, a substantial increase in rotor blade pitch angle results in a substantial increase in torque reaction, and vice versa. This occurs in high speed translational flight but is most pronounced when hovering or at low speed translation.

With the foregoing in mind the present invention provides a control system including automatic means for varying the blade pitch angle of the sustaining rotor, the control system further including mechanism automatically operated concurrently with adjustment of the rotor blade pitch angle to vary the torque counteractive effect of the anti-torque airscrew in a sense compensating for the increase or decrease of torque reaction incident to increase or decrease of rotor blade pitch.

The control system of the present invention further provides a pilot operated control coupled with the anti-torque airscrew to vary the thrust thereof, which pilot operated control serves to control the aircraft in yaw. In the preferred construction the action of the control last mentioned is superimposed upon the condition established as a result of automatic adjustment of the pitch angle of the sustaining rotor. In this way the range of adjustment of the yaw control is always available for normal flight maneuvering.

In the preferred embodiment variation of the thrust of the anti-torque airscrew is effected by varying the pitch of the airscrew blades, this variation in airscrew pitch being employed not only for control in yaw but also to compensate for variation in torque reaction set up as a result of change of blade pitch of the sustaining rotor. With a variable pitch anti-torque airscrew, increase of the pitch angle of the sustaining rotor is automatically accompanied by increase in pitch of the airscrew, and vice versa.

According to another feature of the invention, provision is made for adjustment of the rotor blade pitch angle over a range including a value appropriate for effecting vertical ascent and also a value appropriate for autorotational actuation of the rotor, for example in the event of engine failure. It is contemplated that adjustment of the pitch angle of the sustaining rotor from a high vertical lift pitch angle to a lower autorotational pitch angle shall be accompanied by a reduction in pitch angle of the anti-torque airscrew approximately to that angle giving zero thrust, since in the event of engine failure and continued operation of the sustaining rotor by autorotation, no torque reaction is present and no torque counteractive effect is at that time desired from the airscrew. Moreover, in the preferred embodiment, drive of the airscrew is continued through a transmission coupling it with the rotor, and the airscrew pitch is controllable toward either side of the zero effective pitch value under the influence of the pilot operated yaw control. Thus, effective control in yaw is retained notwithstanding engine failure.

Still another aspect of the invention is the provision of governor controlled means, responsive to increase or decrease of rotor R. P. M. with respect to an equilibrium value, for automatically increasing or decreasing the rotor blade pitch angle and concurrently adjusting the thrust of the anti-torque airscrew in a manner compensating for the fluctuations in rotor driving torque incident to increase or decrease of rotor blade pitch angle. The invention also contemplates provision of a means for adjusting the equilibrium R. P. M. This governor tends to maintain substantially constant R. P. M. of the sustaining motor.

How the foregoing and other objects and advantages are obtained will appear more fully from the following description referring to the accompanying drawings in which—

Figure 1 is a schematic view illustrating a control system according to the present invention associated with a sustaining rotor and with an anti-torque airscrew; and Figure 2 is a view fragmentarily showing certain details of the rotor and airscrew transmission.

Referring first to Figure 1, a sustaining rotor blade is indicated at 4, it being mentioned that the sustaining rotor may incorporate any desired number of blades, each of which is preferably pivotally connected with a rotative hub or shaft. In the form illustrated each blade is mounted by means of pivots providing a universal joint 5 affording freedom for blade swinging movement at least in a plane generally transverse the mean rotative path of travel and preferably also in the lag-lead sense. A pitch change pivot 6 provides for movement of the blade about its own longitudinal axis.

The pivots above described serve to connect the blade with a rotor drive shaft, such as shown at 7, in a manner well understood in this art. The lower end of shaft 7 is adapted to be extended downwardly into the body of the aircraft (not shown) for connection with an engine, preferably through a transmission incorporating appropriate gearing and a manually disconnectible clutch. The transmission also desirably includes an overrunning clutch, diagrammatically indicated at 7a in Fig. 2, so as to insure freedom for autorotation of the rotor in the event of engine failure.

The anti-torque airscrew, the blades of which are indicated at 8—8, may be laterally offset as disclosed in the above mentioned Bennett patent, but in Fig. 1 it is assumed that the airscrew is located at the tail of the machine in position to rotate about a transversely extending horizontal axis. This airscrew is provided with a drive transmission including a shaft 9 adapted to be coupled to the engine in the body of the aircraft. In the preferred embodiment the airscrew drive shaft 9 and the sustaining rotor drive shaft 7 are interconnected, as by gearing shown at 9a in Fig. 2, and the overrunning clutch of the rotor drive transmission is located at a point in the transmission which will not influence the continued rotation of the airscrew under the influence of aerodynamic rotation of the sustaining rotor, as is also shown in Fig. 2.

The blades 8—8 of the airscrew are mounted at their root ends in a hub member 10 by means of bearings providing freedom for pitch change movement of the blades. If desired the blades 8 may also be connected with the hub through other pivots, for instance, of the type indicated for the rotor at 5.

From the foregoing it will be seen that both the sustaining rotor and the anti-torque airscrew are provided with means for variation of the blade pitch angle. In the case of the sustaining rotor provision may be made for periodic differential change of blade pitch for purposes of controlling the aircraft in pitch and roll, but mechanism for effecting this particular type of pitch control need not be considered in detail herein as it forms no part of the present invention per se.

The mean rotor blade pitch angle is adapted to be adjusted by a non-rotative vertically sliding sleeve 11 mounted on the drive shaft 7. Disc 12 is rotatively mounted on sleeve 11 and is adapted to be vertically moved upon vertical movement of the sleeve. The pitch control connections to each blade include an arm 13 carried by disc 12, an arm 14 connected with the blade and a universally jointed link 15 interconnecting arms 13 and 14. As will readily be seen, raising sleeve 11 effects increase of blade pitch, while lowering the sleeve decreases the blade pitch. The arm 14 is desirably extended so that the universal joint at the connection between this arm and the link 15 lies on or close to the pivot axis of the blade mounting joint 5 on which the blade may swing upwardly and downwardly. Because of this arrangement, the pitch of the blade is not extensively altered upon blade swinging.

The vertical movement of sleeve 11 may be effected by means of a lever 16 which is pivotally mounted intermediate its ends, as by a support 17. One end of lever 16 is pivoted to the sleeve and at the opposite side of the support 17 a link 18 is connected, this link being controllable by a governor mechanism now to be described.

The governor is indicated at 19, this governor being of the centrifugal weight type driven by gears 20 and 21, the latter of which is secured to the rotor drive shaft 7. The governor serves to control the direction of rotation of the reversible motor 22 through appropriate wiring associated with the motor and with the contact finger 23 which is adapted to be moved by the governor into engagement with one or the other of the spaced contacts 24 and 25. Contacts 24 and 25 are carried by a movable support 26, the position of which is adjustable by means of lever 27 having a latch adapted to cooperate with the toothed quadrant 28.

The reversible motor 22 drives a worm 29 meshing with a worm wheel 30. The worm wheel is restrained as against axial movement and its hub is threaded to cooperate with the screw threaded shaft 31. The threaded shaft is connected through a universal 32 with the link 18 which is pivotally coupled with the pitch control lever 16 above described.

The operation of the foregoing mechanism is as follows:

When the rotor R. P. M. varies from a predetermined equilibrium speed the governor brings the contact finger 23 into engagement with one or the other of contacts 24 or 25 thereby energizing motor 22 and causing it to rotate in one direction or the other. The sense of this hookup is such that increase in rotational speed of the rotor is accompanied by increase of rotor blade pitch angle, and vice versa. The equilibrium speed at which the governor will function to vary the rotor blade pitch angle may be adjusted by the pilot by means of control lever 27.

The motor 22 is also employed for the purpose of effecting automatic adjustment of the pitch of the anti-torque airscrew concurrently with adjustment of the rotor blade pitch angle. This is accomplished by means of a cable system 33 which is connected with one end of pitch control lever 16, the cables being passed over appropriate guide pulleys downwardly into the body of the aircraft and thence rearwardly to the pitch adjusting chain length 34 of the anti-torque airscrew. This cable system 33 passes over spaced pulleys 35—35 which are mounted on a transversely slidable bar or support 36. The bar 36 may be moved transversely by a cable system 37 actuable by any suitable pilot's control, preferably foot pedals or a pivoted bar such as indicated at 38.

With the airscrew control system just described the airscrew pitch may be altered in either one of two different ways, the two effects being superimposed one upon the other. Thus, with the bar 38 held in a given position, operation of the motor 22 will effect pitch change of the anti-torque airscrew, the sense of the hookup being such that the airscrew pitch is increased concurrently with increase in rotor blade pitch, and vice versa. On the other hand with any given pitch setting established by the governor system, the bar 38 may be moved so as to cause the pulley support 36 to move transversely and this operation will also change the airscrew pitch (but without altering the rotor blade pitch), the sence of this hookup being such as to provide for control of the aircraft in yaw in the general manner and in the instinctive sense of the usual rudder bar.

The system described has as an advantage the automatic governor operation which serves as a means for maintaining substantially constant R. P. M. of the sustaining rotor, although provision is also made for adjustment of the equilibrium R. P. M. Moreover, this system provides for automatic variation of the torque counteractive effect of the anti-torque airscrew in accordance with variations in torque reaction incident to drive of the rotor with the rotor blade pitch angle at different values.

It is contemplated that the rotor blade pitch angle be capable of variation over a range including a relatively high positive pitch value suitable for vertical ascent with the rotor power driven, and a lower pitch value appropriate for autorotational actuation to provide for descent without power. Moreover, it is contemplated that when the rotor blade pitch is reduced to a predetermined autorotational pitch value the thrust of the anti-torque airscrew shall concurrently be reduced substantially to zero.

As a more or less specific advantage of the arrangement described, it is noted that the control lever arrangement, including the lever 16 (and the points of connection thereof with the sleeve 11, support 17, link 18 and cable 33), provides a different ratio of movement of the sleeve 11 for controlling the rotor blade pitch, as compared with the movement of the cable system 33 for controlling the anti-torque airscrew pitch. While these ratios of control movement can of course be altered by variation in various of the lever arms incorporated in the rotor and airscrew pitch control systems, in general, a larger movement in the airscrew control system than in the rotor control system is desirable. It will be noted from Fig. 1 that this relationship is provided by virtue of the points of connection of the lever 16 with the support 17 and the other associated elements.

It may be mentioned that while positively acting releasable latches or the like may be associated with the bar 38, these may not always be required, particularly since the cable systems are so arranged that operation of the conjoint control for both the rotor and the airscrew will have little tendency to move the rudder bar, since the aerodynamic control loads are small. A relatively light frictional restraint, for example at the mounting pivot, is sufficient to prevent undesired movement of a foot control bar in the system as disclosed.

The present application is a division of my copending application Serial No. 535,632, filed May 15, 1944, issued June 14, 1949, as Patent No. 2,473,299.

I claim:

1. In an aircraft having a sustaining rotor and an airscrew, means for varying the pitch of the rotor, means for varying the pitch of the airscrew, and mechanism for concurrently actuating said two means comprising a governor device responsive to variation in rotor R. P. M., and a lever pivoted intermediate its ends and pivotally movable by said governor device, the means for varying the rotor pitch being connected with said lever toward one side of its pivot and the means for varying the airscrew pitch being connected with said lever toward the other side of its pivot.

2. A construction according to claim 1 in which the means for varying the airscrew pitch is connected with said lever farther from its pivot than is the means for varying the rotor pitch.

3. In an aircraft having a sustaining rotor and an airscrew the latter of which is arranged to provide yawing moments, means for varying the pitch of the airscrew, and mechanism for actuating said means comprising a governor device responsive to variation in rotor R. P. M., a manually controllable device, and interconnections for superimposing the effects of said two devices on the pitch control means, which interconnections comprise a closed circuit cable system interconnecting the governor device and the airscrew, and means actuable by said manually controllable device for concurrently lengthening one cable run of said system and shortening the other run of said system.

HAROLD F. PITCAIRN.

REFERENCES CITED

The following references are of record in the file of this patent:

UNITED STATES PATENTS

| Number | Name | Date |
| --- | --- | --- |
| 2,317,340 | Bennett | Apr. 27, 1943 |
| 2,318,259 | Sikorsky | May 4, 1943 |
| 2,350,126 | Pitcairn | May 30, 1944 |
| 2,385,889 | Skavinsky | Oct. 7, 1945 |